F. POHLMAN.
Hay and Straw Cutter.
No. 35,468.            Patented June 3, 1862.
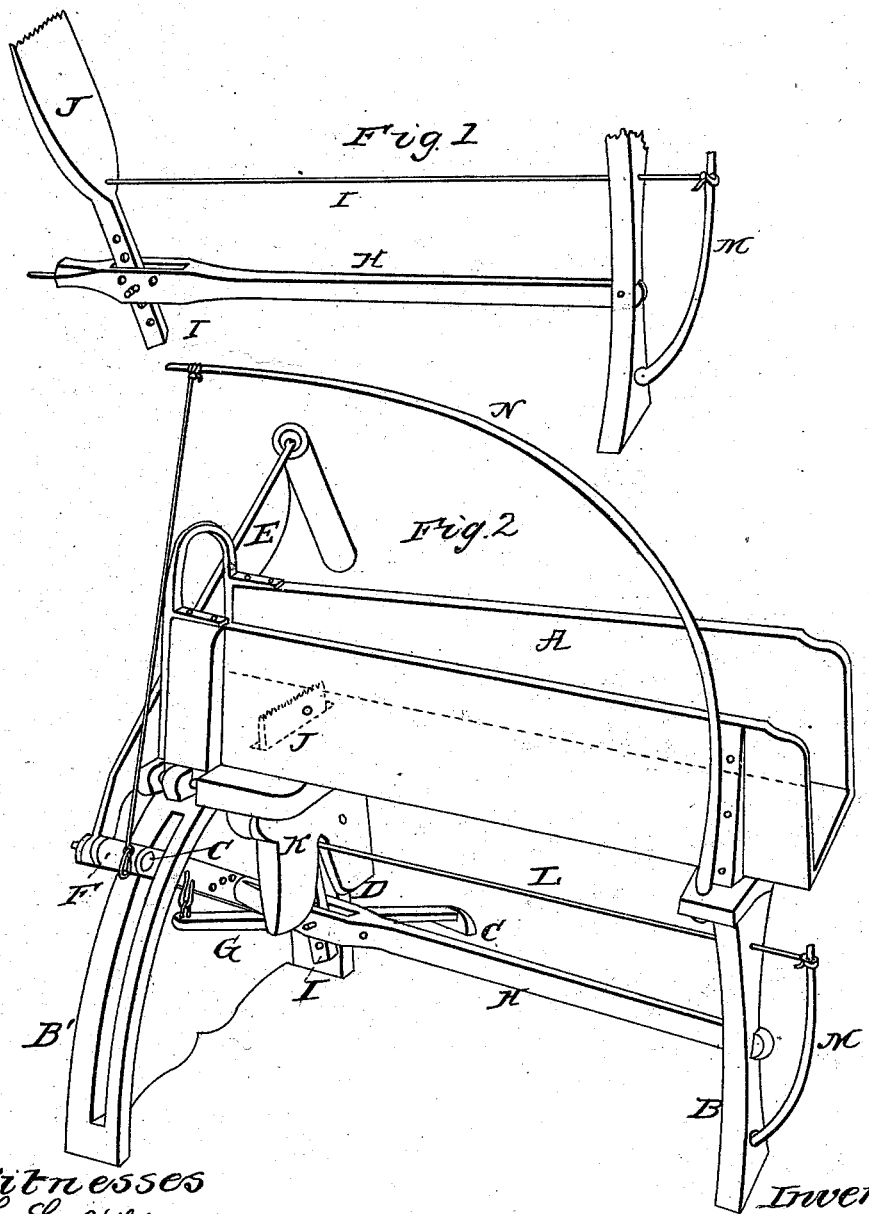
Witnesses
L. L. Hill.
Wm Webber.
Inventor
Fredrick Pohlman.

United States Patent Office.

FREDERICK POHLMAN, OF COXSACKIE, NEW YORK.

IMPROVEMENT IN HAY AND STRAW CUTTERS.

Specification forming part of Letters Patent No. 35,468, dated June 3, 1862.

*To all whom it may concern:*

Be it known that I, FREDERICK POHLMAN, of Coxsackie, in the county of Greene and State of New York, have invented a new and Improved Mode for Cutting Straw, Hay, Stalks, Sugar-Cane, and similar substances; and I do hereby declare that the following is a full and exact description thereof, reference being had to the accompanying drawings, and to the letters of reference marked thereon.

The nature of my invention consists in constructing a straw-cutter to be operated with a knife working at one end of a feeding-trough, said knife to be operated by the compound power of the hand and foot by means of a treadle, and the whole so constructed that the treadle shall operate a toothed feeder working through the bottom of the trough and impelling the straw upward and forward at every stroke, the same being adjustable for cutting the straw any required length.

To enable others skilled in the art to make and use my invention, I will proceed to describe its construction and operation.

I construct my straw-cutter in any of the known forms, with a trough for holding the straw, the same supported by a suitable frame. In the drawings this trough is marked A and the supports B B'. The forward support, B, is made in an oval form and provided with a slotted groove, as shown at C, for the purpose of supporting and guarding the motion of lever C and giving a uniform bearing to the same. This lever C is hung at D and connected with the lower end of knife E by means of a toggle-joint, F. A treadle, G, resting on the floor at O, is connected with lever C at or near D, so as to produce a purchase, the whole being, in fact, from the knife-handle to the foot of treadle G a compound lever, thus giving the operator great power over the knife. A horizontal shaft, H, receives pin I of feeder J, said pin being furnished with holes at different distances, so that it may be adjusted to increase or diminish the throw of the feeder J. Said feeder J is a flat blade with a toothed edge, and works through a transverse slot in the bottom of the trough a short distance back of the knife. The blade of the toothed feeder is held against the guide K by means of cord L and spring M. A cord attached at the toggle-joint of lever C terminates at the end of spring N and is fastened to the end of the same.

The office of spring N is to aid the return-stroke of the cutter and to elevate the feeder, and, in doing so, both lessens the labor and tends to equalize the action of the machine. The spring may be made of wood, steel, india-rubber, or other elastic material; but I prefer wood because of its cheapness and the facility with which it may be repaired.

In operating this machine the straw or other material to be cut is placed in the trough and held by a gentle pressure of the left hand. With the left foot upon the treadle and the right hand upon the handle of the knife, you proceed to operate the knife in the curve naturally given to its motion by the joint action of the combined levers and springs, which will be found to be a sort of compound cutting and shaving stroke, highly conducive to the end in view.

I do not claim in the above invention the frame, trough, knife, or guard for the knife separately considered; but

What I claim as my invention, and desire to secure by Letters Patent, is—

1. The combination of the knife with the lever C, the treadle G, and the shaft H, the whole acting as and for the purposes named.

2. The feeder J as connected with the shaft H and the springs M and N and as supported by guide K and working in the transverse slot, as described, the whole constructed in the manner and working essentially as and for the purposes set forth.

FREDERICK POHLMAN.

Witnesses:
 WILLIAM WEBBER,
 LEVI L. HILL.